(12) United States Patent
Russell et al.

(10) Patent No.: US 6,708,100 B2
(45) Date of Patent: Mar. 16, 2004

(54) SAFE DISTANCE ALGORITHM FOR ADAPTIVE CRUISE CONTROL

(75) Inventors: Mark E. Russell, Westford, MA (US); Michael Joseph Delcheccolo, Westford, MA (US); Walter Gordon Woodington, Littleton, MA (US); H. Barteld Van Rees, Needham, MA (US); John Michael Firda, Andover, MA (US); Delbert Lippert, Cobden (CA)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/217,128

(22) Filed: Aug. 12, 2002

(65) Prior Publication Data

US 2003/0004633 A1 Jan. 2, 2003

Related U.S. Application Data

(62) Division of application No. 09/931,630, filed on Aug. 16, 2001.
(60) Provisional application No. 60/226,160, filed on Aug. 16, 2000.

(51) Int. Cl.$^7$ .............................................. B60K 31/00
(52) U.S. Cl. ......................................... 701/96; 701/300
(58) Field of Search .............................. 701/70, 93, 96, 701/300, 301; 342/71; 340/903, 904; 180/170–179, 167–169

(56) References Cited

U.S. PATENT DOCUMENTS

| 3,697,985 A | 10/1972 | Faris et al. |
| 3,935,559 A | 1/1976 | Straffon et al. |
| 3,940,696 A | 2/1976 | Nagy |

(List continued on next page.)

FOREIGN PATENT DOCUMENTS

| DE | 196 32 889 | 2/1998 |
| DE | 195 23 693 | 5/1998 |
| DE | 198 50 128 | 5/1999 |

(List continued on next page.)

OTHER PUBLICATIONS

Barnett, Roy I. et al. "A Feasibility Study of Stripline–Fed Slots Arranged as a Planar Array with Circular Grid and Circular Boundary", IEEE, 1989, pp. 1510–1515.

Bhattacharyya, Arum, et al. "Analysis of Stripline–Fed–Coupled Patch Antennas with Vias for Parallel–Plate Mode Suppression", IEEE Transactions on Antennas and Propagation, vol. 46, No. 4, Apr. 1998, pp. 538–545.

Clouston E.N. et al. "A Triplate Stripline Slot Antenna Developed for Time–Domail Measurements on Phased Arrays", 1998, pp. 312–315.

(List continued on next page.)

Primary Examiner—Richard M. Camby
(74) Attorney, Agent, or Firm—Daly, Crowley & Mofford, LLP

(57) ABSTRACT

In accordance with the present invention, an adaptive cruise control system includes a radio frequency (RF) transmit receive (TR) sensor module (or more simply "sensor") disposed such that a detection zone is deployed in front of a vehicle. The sensor includes a sensor antenna system which comprises a transmit antenna for emitting or transmitting an RF signal and a receive antenna for receiving portions of the transmitted RF signal which are intercepted by one or more objects within a field of view of the transmit antenna and reflected back toward the receive antenna. With this particular arrangement, a detection system that detects objects in a region about a front of a vehicle is provided. If the system determines that the vehicle is approaching an object or that an object is approaching the vehicle, then the sensor initiates steps that are carried out in accordance with a set of rules that control an accelerator of the vehicle. The accelerator is adjusted to maintain a safe trailing distance behind the detected object.

10 Claims, 4 Drawing Sheets

U.S. PATENT DOCUMENTS

| | | |
|---|---|---|
| 3,974,501 A | 8/1976 | Ritzie |
| 3,978,481 A | 8/1976 | Angwin et al. |
| 4,003,049 A | 1/1977 | Sterzer et al. |
| 4,008,473 A | 2/1977 | Hinachi et al. |
| 4,008,475 A | 2/1977 | Johnson |
| 4,035,797 A | 7/1977 | Nagy |
| 4,063,243 A | 12/1977 | Anderson et al. |
| 4,079,377 A | 3/1978 | zur Heiden et al. |
| 4,143,370 A | 3/1979 | Yamanaka et al. |
| 4,203,113 A | 5/1980 | Baghdady |
| 4,209,791 A | 6/1980 | Gerst et al. |
| 4,217,582 A | 8/1980 | Endo et al. |
| 4,246,585 A | 1/1981 | Mailloux |
| 4,308,536 A | 12/1981 | Sims, Jr. et al. |
| 4,348,675 A | 9/1982 | Senzaki et al. |
| 4,349,823 A | 9/1982 | Tagami et al. |
| 4,409,899 A | 10/1983 | Owen et al. |
| 4,414,550 A | 11/1983 | Tresselt |
| 4,507,662 A | 3/1985 | Rothenberg et al. |
| 4,543,577 A | 9/1985 | Tachibana et al. |
| 4,549,181 A | 10/1985 | Tachibana et al. |
| 4,622,636 A | 11/1986 | Tachibana |
| 4,673,937 A | 6/1987 | Davis |
| 4,703,429 A | 10/1987 | Sakata |
| 4,718,558 A | 1/1988 | Castaneda |
| 4,901,083 A | 2/1990 | May et al. |
| 4,962,383 A | 10/1990 | Tresselt |
| 4,970,653 A | 11/1990 | Kenue |
| 4,994,809 A | 2/1991 | Yung et al. |
| 5,008,678 A | 4/1991 | Herman |
| 5,014,200 A | 5/1991 | Chundrlik et al. |
| 5,023,617 A | 6/1991 | Deering |
| 5,045,856 A | 9/1991 | Paoletti |
| 5,115,245 A | 5/1992 | Wen et al. |
| 5,134,411 A | 7/1992 | Adler |
| 5,138,321 A | 8/1992 | Hammer |
| 5,173,859 A | 12/1992 | Deering |
| 5,189,426 A | 2/1993 | Asbury et al. |
| 5,235,316 A | 8/1993 | Qualizza |
| 5,249,027 A | 9/1993 | Mathur et al. |
| 5,249,157 A | 9/1993 | Taylor |
| 5,252,981 A | 10/1993 | Grein et al. |
| 5,268,692 A | 12/1993 | Grosch et al. |
| 5,280,288 A | 1/1994 | Sherry et al. |
| 5,285,207 A | 2/1994 | Asbury et al. |
| 5,302,956 A | 4/1994 | Asbury et al. |
| 5,315,303 A | 5/1994 | Tsou et al. |
| 5,325,096 A | 6/1994 | Pakett |
| 5,325,097 A | 6/1994 | Zhang et al. |
| 5,339,075 A | 8/1994 | Abst et al. |
| 5,341,144 A | 8/1994 | Stove |
| 5,351,044 A | 9/1994 | Mathur et al. |
| RE34,773 E | 11/1994 | Dombrowski |
| 5,390,118 A | 2/1995 | Margolis et al. |
| 5,394,292 A | 2/1995 | Hayashida |
| 5,396,252 A | 3/1995 | Kelly |
| 5,400,864 A | 3/1995 | Winner et al. |
| 5,410,745 A | 4/1995 | Friesen et al. |
| 5,414,643 A | 5/1995 | Blackman et al. |
| 5,451,960 A | 9/1995 | Kastella et al. |
| 5,454,442 A | 10/1995 | Labuhn et al. |
| 5,467,072 A | 11/1995 | Michael |
| 5,467,283 A | 11/1995 | Butsuen et al. |
| 5,471,214 A | 11/1995 | Faibish et al. |
| 5,481,268 A | 1/1996 | Higgins |
| 5,483,453 A | 1/1996 | Uemura et al. |
| 5,485,155 A | 1/1996 | Hibino |
| 5,485,159 A | 1/1996 | Zhang et al. |
| 5,486,832 A | 1/1996 | Hulderman |
| 5,493,302 A | 2/1996 | Woll et al. |
| 5,495,252 A | 2/1996 | Adler |
| 5,508,706 A | 4/1996 | Tsou et al. |
| 5,517,196 A | 5/1996 | Pakett et al. |
| 5,517,197 A | 5/1996 | Algeo et al. |
| 5,521,579 A | 5/1996 | Bernhard |
| 5,525,995 A | 6/1996 | Benner |
| 5,530,447 A | 6/1996 | Henderson et al. |
| 5,572,428 A | 11/1996 | Ishida et al. |
| 5,583,495 A | 12/1996 | Ben Lu lu |
| 5,587,908 A | 12/1996 | Kajiwara |
| 5,613,039 A | 3/1997 | Wang et al. |
| 5,625,362 A | 4/1997 | Richardson |
| 5,627,510 A | 5/1997 | Yuan |
| 5,633,642 A | 5/1997 | Hoss et al. |
| 5,654,715 A | 8/1997 | Hayashikura et al. |
| 5,670,963 A | 9/1997 | Kubota et al. |
| 5,675,345 A | 10/1997 | Pozgay et al. |
| 5,678,650 A | 10/1997 | Ishihara et al. |
| 5,712,640 A | 1/1998 | Andou et al. |
| 5,715,044 A | 2/1998 | Hayes |
| 5,717,399 A | 2/1998 | Urabe et al. |
| 5,719,580 A | 2/1998 | Core |
| 5,731,778 A | 3/1998 | Nakatani et al. |
| 5,734,344 A | 3/1998 | Yamada |
| 5,757,074 A | 5/1998 | Matloubian et al. |
| 5,767,793 A | 6/1998 | Agravante et al. |
| 5,771,007 A | 6/1998 | Arai et al. |
| 5,777,563 A | 7/1998 | Minissale et al. |
| 5,805,103 A | 9/1998 | Doi et al. |
| 5,808,561 A | 9/1998 | Kinoshita et al. |
| 5,808,728 A | 9/1998 | Uehara |
| 5,818,355 A | 10/1998 | Shirai et al. |
| 5,839,534 A | 11/1998 | Chakraborty et al. |
| 5,905,472 A | 5/1999 | Wolfson et al. |
| 5,923,280 A | 7/1999 | Farmer |
| 5,929,802 A | 7/1999 | Russell et al. |
| 5,938,714 A | 8/1999 | Santonaka |
| 5,940,011 A | 8/1999 | Agravante et al. |
| 5,949,366 A | 9/1999 | Herrmann |
| 5,959,570 A | 9/1999 | Russell |
| 5,977,904 A | 11/1999 | Mizuno et al. |
| 5,978,736 A | 11/1999 | Greendale |
| 5,999,092 A | 12/1999 | Smith et al. |
| 5,999,119 A | 12/1999 | Carnes et al. |
| 6,011,507 A | 1/2000 | Curran et al. |
| 6,018,308 A | 1/2000 | Shirai |
| 6,026,347 A | 2/2000 | Schuster |
| 6,026,353 A | 2/2000 | Winner |
| 6,028,548 A | 2/2000 | Farmer |
| 6,037,860 A | 3/2000 | Zander et al. |
| 6,037,894 A | 3/2000 | Pfizenmaier et al. |
| 6,040,796 A | 3/2000 | Matsugatani et al. |
| 6,043,772 A | 3/2000 | Voigtlaender et al. |
| 6,044,321 A | 3/2000 | Nakamura et al. ............ 701/96 |
| 6,049,257 A | 4/2000 | Hauk |
| 6,052,080 A | 4/2000 | Magori |
| 6,057,797 A | 5/2000 | Wagner |
| 6,069,581 A | 5/2000 | Bell et al. |
| 6,070,682 A | 6/2000 | Isogai et al. |
| 6,075,492 A | 6/2000 | Schmidt et al. |
| 6,076,622 A | 6/2000 | Chakraborty et al. |
| 6,085,151 A | 7/2000 | Farmer et al. |
| 6,087,975 A | 7/2000 | Sugimoto et al. |
| 6,091,355 A | 7/2000 | Cadotte, Jr. et al. |
| 6,097,331 A | 8/2000 | Matsugatani et al. |
| 6,097,931 A | 8/2000 | Weiss et al. |
| 6,104,336 A | 8/2000 | Curran et al. |
| 6,107,956 A | 8/2000 | Russell et al. |
| 6,114,985 A | 9/2000 | Russell et al. |
| 6,127,965 A | 10/2000 | McDade et al. |
| 6,130,607 A | 10/2000 | McClanahan et al. |

| | | |
|---|---|---|
| 6,147,637 A | 11/2000 | Morikawa et al. |
| 6,147,638 A | 11/2000 | Rohling et al. |
| 6,154,168 A | 11/2000 | Egawa et al. |
| 6,161,073 A | 12/2000 | Tange et al. |
| 6,163,252 A | 12/2000 | Nishiwaki |
| 6,184,819 B1 | 2/2001 | Adomat et al. |
| 6,188,950 B1 | 2/2001 | Tsutsumi et al. |
| 6,198,426 B1 | 3/2001 | Tamatsu et al. |
| 6,198,434 B1 | 3/2001 | Martek et al. |
| 6,215,438 B1 | 4/2001 | Oswald et al. |
| 6,225,918 B1 | 5/2001 | Kam |
| 6,232,910 B1 | 5/2001 | Bell et al. |
| 6,233,516 B1 | 5/2001 | Egawa |
| 6,252,560 B1 | 6/2001 | Tanaka et al. |
| 6,255,984 B1 | 7/2001 | Kreppold et al. |
| 6,256,573 B1 | 7/2001 | Higashimata |
| 6,259,395 B1 | 7/2001 | Adachi et al. |
| 6,265,990 B1 | 7/2001 | Isogai et al. |
| 6,268,803 B1 | 7/2001 | Gunderson et al. |
| 6,269,298 B1 | 7/2001 | Seto |
| 6,278,400 B1 | 8/2001 | Cassen et al. |
| 6,289,332 B2 | 9/2001 | Menig et al. |
| 6,307,622 B1 | 10/2001 | Lewis |
| 6,317,073 B1 | 11/2001 | Tamatsu et al. |
| 6,317,075 B1 | 11/2001 | Heide et al. |
| 6,317,090 B1 | 11/2001 | Nagy et al. |
| 6,320,547 B1 | 11/2001 | Fathy et al. |
| 6,327,530 B1 | 12/2001 | Nishimura et al. |
| 6,329,952 B1 | 12/2001 | Grace |
| 6,330,507 B1 | 12/2001 | Adachi et al. |
| 6,335,705 B1 | 1/2002 | Grace et al. |
| 6,345,227 B1 | 2/2002 | Egawa et al. |
| 6,351,702 B1 | 2/2002 | Tange et al. |
| 6,360,158 B1 | 3/2002 | Hanawa et al. |
| 6,366,235 B1 | 4/2002 | Mayer et al. |
| 2002/0049539 A1 | 4/2002 | Russell et al. |
| 2002/0067287 A1 | 6/2002 | Delcheccolo et al. |

FOREIGN PATENT DOCUMENTS

| | | |
|---|---|---|
| EP | 0 398 712 | 5/1990 |
| EP | 0 484 995 | 5/1992 |
| EP | 0 642 190 A1 | 12/1993 |
| EP | 0 784 213 | 1/1996 |
| EP | 0 887 658 | 12/1998 |
| EP | 0 932 052 | 7/1999 |
| EP | 0 978 729 A2 | 2/2000 |
| EP | 0 982 173 | 3/2000 |
| EP | 1 020 989 | 7/2000 |
| FR | 2 709 834 | 9/1993 |

OTHER PUBLICATIONS

Das, Nirod K. et al. "Multiport Scattering Analysis of General Multilayered Printed Anetnnas Fed by Multiple Feed Ports: Part II–Applications", IEEE, 1992, pp. 482–491.

Katehi, Pisti B. et al. "Design of a Low Sidelobe Level Stripline Fed Slot Array Covered by a Dielectric Layer", 1989, pp. 978–981.

Kimura, Yuichi et al. "Alternating Phase Single–Layer Slotted Waveguide Arrays at 25 GHz Band", IEEE, 1999, pp. 142–145.

Muir, A., "Analysis of Stripline/Slot Transition", Electronics Letter, vol. 26 No. 15, pp. 1160–1161.

Sakaibara, Kunio et al. "A Single Slotted Waveguide Array for 22GHz Band Radio System Between Mobile Base Station", IEEE, 1994, pp. 356–359.

Sangster, Alan et al. "A Moment Method Analysis of a Transverse Slot Fed by a Boxed Stripline", (No Date) pp. 146–149.

Schaubert, Daniel H. et al. "Moment Method Analysis of Infinite Stripline–Fed Tapered Slot Antenna Arrays with a Ground Plane", IEEE Transactions on Antennas and Propagation, vol. 42, No. 8, Aug. 1994, pp. 1161.

Smith, Peter "Transverse Slot Radiator in the Ground–Plane of Enclosed Stripline", $10^{th}$ International Conference on Antennas and Propagation 14.17, Apr. 1997, 5 pages.

Theron, Isak Petrus et al. "On Slotted Waveguide Antenna Design at Ka–Band", IEEE Trans. vol. 32, Oct. 1984, pp. 1425–1426.

International Search Report of PCT Application No. PCT/US01/25594 dated May 7, 2002.

G.S. Dow, et al. "Monolithic Receivers with Integrated Temperature Compensation Function", IEEE GaAs IC Symposium, 1991, pp. 267–269.

International Search Report of PCT Application No. PCT/US01/25682 dated May 14, 2002.

International Search Report of PCT Application No. PCT/US01/25676 dated Dec. 21, 2001.

International Search Report of PCT Application No. PCT/US01/25677 dated Apr. 17, 2002.

Partial International Search Report of PCT Application No. PCT/US01/25642 dated May 27, 2002.

J. M. Ferryman, et al., "Visual Surveillance for Moving Vehicles", Department of Computer Science, England.

SAFE DISTANCE ALGORITHM FOR ADAPTIVE CRUISE CONTROL

CROSS-REFERENCE TO RELATED APPLICATIONS

This application is a divisional of and claims the benefit of pending U.S. patent application No. 09/931,630, entitled Safe Distance Algorithm for Adaptive Cruise Control, filed on Aug. 16, 2001, which claims the benefit of Provisional Application No. 60/226,160 filed on Aug. 16, 2000, which applications are hereby incorporated by reference in their entireties.

BACKGROUND OF THE INVENTION

One option that is popular with motor vehicles is cruise control. Cruise control allows an operator of a motor vehicle to set a predetermined speed for the vehicle, and maintains the vehicle at that speed until either the cruise control is turned off, or the brakes are applied.

A motor vehicle typically has a speed sensor mounted on an output shaft of a transmission. The speed sensor provides a series of pulses to a computer. When a vehicle's speed increases the frequency of the pulses will also increase. There is a concomitant decrease in the frequency of the pulses from the speed sensor when the speed of the vehicle decreases. For a given vehicle speed, there is a correlated frequency of the pulse stream from the speed sensor. The cruise control attempts to maintain the pulse frequency of the desired speed by regulating the accelerator of the vehicle.

The cruise control stores the speed of the vehicle when the cruise control is set to the desired speed. The cruise control receives the pulse stream from the speed sensor and compares the frequency of the pulse stream to the frequency value of the set speed. The cruise control, in response to a difference between the pulse stream from the sensor and the stored set value operates a vacuum controlled diaphragm that is coupled to the accelerator linkage. The accelerator is controlled in order to maintain the pulse stream from the speed sensor as close to the stored value as possible.

It is common for a vehicle operator to use cruise control to maintain a constant speed on a highway. In the event another operator makes a lane change into the path of the vehicle or the vehicle comes upon a slower driver the operator is required to disable the cruise control, typically by stepping on the brake. A problem occurs when the operator is slow to react to the other vehicle and fails to disable the cruise control in time.

In view of the dangers associated with automobile travel, there is an ongoing need or the vehicle comes upon a slower driver the operator is required to disable the cruise control, typically by stepping on the brake. A problem occurs when the operator is slow to react to the other vehicle and fails to disable the cruise control in time.

In view of the dangers associated with automobile travel, there is an ongoing need for enhanced automobile driver aides. One possible area of increased driver aides involves detection of objects in front of a vehicle. As the vehicle approaches objects (e.g. other vehicles, pedestrians and obstacles) or as objects approach the vehicle a driver cannot always detect the object and perform intervention actions necessary to avoiding a collision with the object.

To enhance the safety of trucks, for example, sensor systems or more simply "sensors" for detecting objects around a truck have been suggested. Such sensors typically include an optical or infrared (IR) detector for detecting obstacles in the path of the vehicle.

In such an application, it is necessary to provide a sensor capable of accurately and reliability detecting objects in the path of the vehicle.

Radar is a suitable technology for implementing a sensor for use in vehicles such as automobiles and trucks. One type of radar suitable for this purpose is Frequency Modulated Continuous Wave (FMCW) radar. In typical FMCW radar, the frequency of the transmitted CW signal linearly increases from a first predetermined frequency to a second predetermined frequency. FMCW radar has the advantages of high sensitivity, relatively low transmitter power and good range resolution.

Because sensors disposed on vehicles are consumer products that may affect the safety of vehicles, the accuracy and reliability of the sensors are tantamount. Aspects of the sensors which contribute to its accuracy and reliability include its susceptibility to noise and the overall precision with which received radio frequency (RF) signals are processed to detect objects within the field of view of the sensor. Susceptibility to noise for example can cause false detections and, even more deleteriously, cause an object to go undetected.

Further significant attributes of the sensors are related to its physical size and form factor. Preferably, the sensor is housed in a relatively small enclosure or housing mountable behind a surface of the vehicle. For accuracy and reliability, it is imperative that the transmit antenna and receive antenna and circuitry of the sensor are unaffected by attributes of the vehicle (e.g. the vehicle grill, bumper or the like) and that the sensors are mounted to the vehicle in a predictable alignment.

It would, therefore, be desirable to provide a sensor system which is capable of detecting the presence of objects in front of a vehicle and further to detect the speed of these objects. Once this information is obtained the speed of the vehicle can be adjusted to maintain a safe trailing distance behind an object located in front of the vehicle.

BRIEF SUMMARY OF THE INVENTION

In accordance with the present invention, a detection system is utilized to control the speed of a vehicle, known as Adaptive Cruise Control. The system includes a radio frequency (RF) transmit receive (TR) sensor module (or more simply "sensor") disposed such that a detection zone is deployed in front of a vehicle. The sensor includes a sensor antenna system which comprises a transmit antenna for emitting or transmitting an RF signal and a receive antenna for receiving portions of the transmitted RF signal which are intercepted by one or more objects within a field of view of the transmit antenna and reflected back toward the receive antenna. A signal antenna can be used for both the transmitting and receiving.

With this particular arrangement, a detection system that detects objects in a region about a front of a vehicle is provided. If the system determines that the vehicle is approaching an object or that an object is approaching the vehicle, then the sensor initiates steps that are carried out in accordance with a set of rules that control the speed of the vehicle. The speed of the vehicle is adjusted to maintain a safe trailing distance behind the detected object, thereby providing an adaptive cruise control function to the vehicle.

BRIEF DESCRIPTION OF THE DRAWINGS

The foregoing features of this invention, as well as the invention itself, may be more fully understood from the following description of the drawings in which.

DETAILED DESCRIPTION OF THE INVENTION

Figure 1:
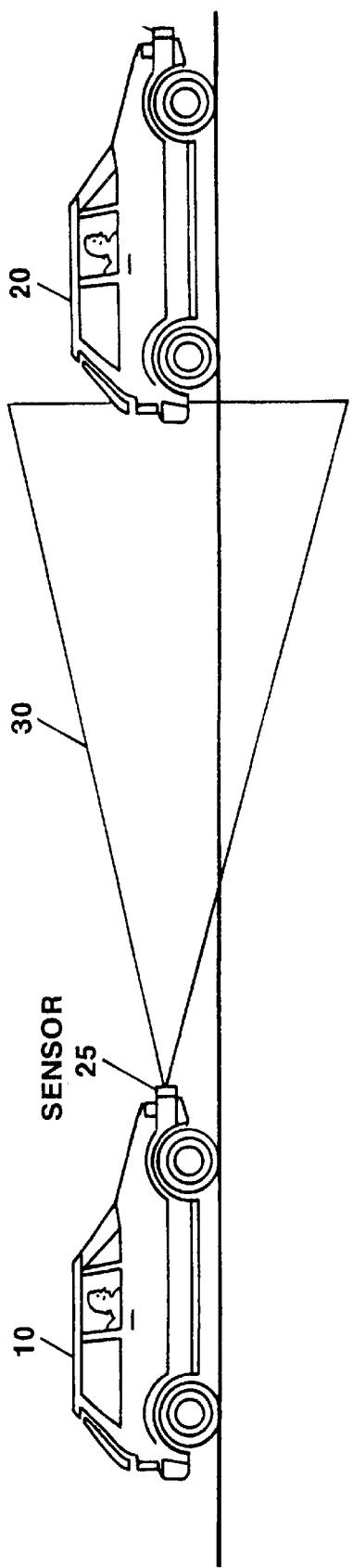
FIG. 1 is a diagram showing a lead vehicle and a trailing vehicle equipped with the present invention.

Referring now to FIG. 1, a vehicle 10 is shown having a zone of coverage 20 for performing adaptive cruise control. Vehicle 10 is shown as an automobile, however the presently disclosed invention could be used with any other type of vehicle such as a motorcycle, truck, aircraft, marine vehicle, agricultural vehicle or the like.

The adaptive cruise control zone of coverage 20 is provided by a forward looking sensor 25 described in U.S. Pat. No. 5,929,802 assigned to the assignee of the present invention and incorporated herein by reference. The forward-looking sensor is part of an RF detection system that utilizes an antenna system that provides multiple beams in the coverage zone. In this manner, the particular direction in which another object approaching the vehicle or vice-versa can be found. In one particular embodiment, the sensor utilizes an antenna system that includes eight separate antenna beams. Therefore, the RF system can operate in a manner similar to that described in the above-referenced U.S. Pat. No. 5,929,802.

The sensor utilizes Frequency Modulated Continuous Wave radar which transmits a linear FM signal which is reflected from objects within the radar's zone of coverage. The reflected signal is compared (mixed) with the transmit signal to determine the round trip travel time of the reflected signal via a frequency difference. This frequency difference is known as the IF signal. The frequency of the IF signal is proportional to the range of the object. The FMCW radar can detect stationary objects as well as objects with no motion relative to the originating vehicle (e.g. another vehicle traveling at the same speed).

As shown in FIG. 1 a first vehicle 10 is equipped with a detection system that is coupled to the accelerator of the vehicle. The detection system includes a transmit antenna, a receive antenna, a receiver circuit and an interface to control the accelerator of the first vehicle. The sensor provides a zone of coverage 30. The transmit antenna of the sensor provides a Frequency Modulated Continuos Wave (FMCW) radar which transmits an FM signal providing the zone of coverage 30. Vehicle 10 is referred to as a trailing vehicle. When trailing vehicle 10 encounters a lead vehicle 20, the FM signal provided by the transmit antenna is reflected by the lead vehicle back to the sensor of trailing vehicle 10. The reflected signal is received by the receive antenna and is compared with the transmit signal. The frequency difference between the transmit signal and the received signal is proportional to the distance between the lead vehicle and the trailing vehicle. By providing continuos signals, the speed of the lead vehicle with respect to the trailing vehicle can be determined from repeated measurements of the reflected signals.

A well-known safety rule is the so-called "three second" rule. The three second rule states that a safe distance between a lead vehicle and a trailing vehicle is the distance that can be covered in three seconds traveling at the speed of the lead vehicle. This distance translates to approximately 198 feet at 45 miles per hour, 242 feet at 55 miles per hour and 286 feet at 65 miles per hour.

In a particular embodiment the three-second rule is used to determine a travel distance, though other rule sets could also be used. This travel distance provides a base line distance, but to provide a larger degree of safety, the travel distance is modified to take into account the weight of the trailing vehicle. When the trailing vehicle is large, it will take more time to stop than a lighter vehicle, therefore the travel distance is modified according to the weight of the trailing vehicle to provide a safe trailing distance.

With the safe trailing distance determined, the sensor adjusts the accelerator of the trailing vehicle to keep the safe trailing distance maintained between itself and the lead vehicle. This is done automatically and dynamically, so that the driver input is reduced or removed. For example, if the trailing vehicle were traveling on a highway and has it's cruise control set at 65 miles per hour, and a vehicle changes lanes in front of the driver, the accelerator is dynamically controlled to permit a safe traveling distance between the trailing vehicle and the lead vehicle. Similarly, if a slower moving vehicle is encountered, the accelerator is controlled such that the faster moving trailing vehicle does not overcome the safe trailing distance.

Figure 2:
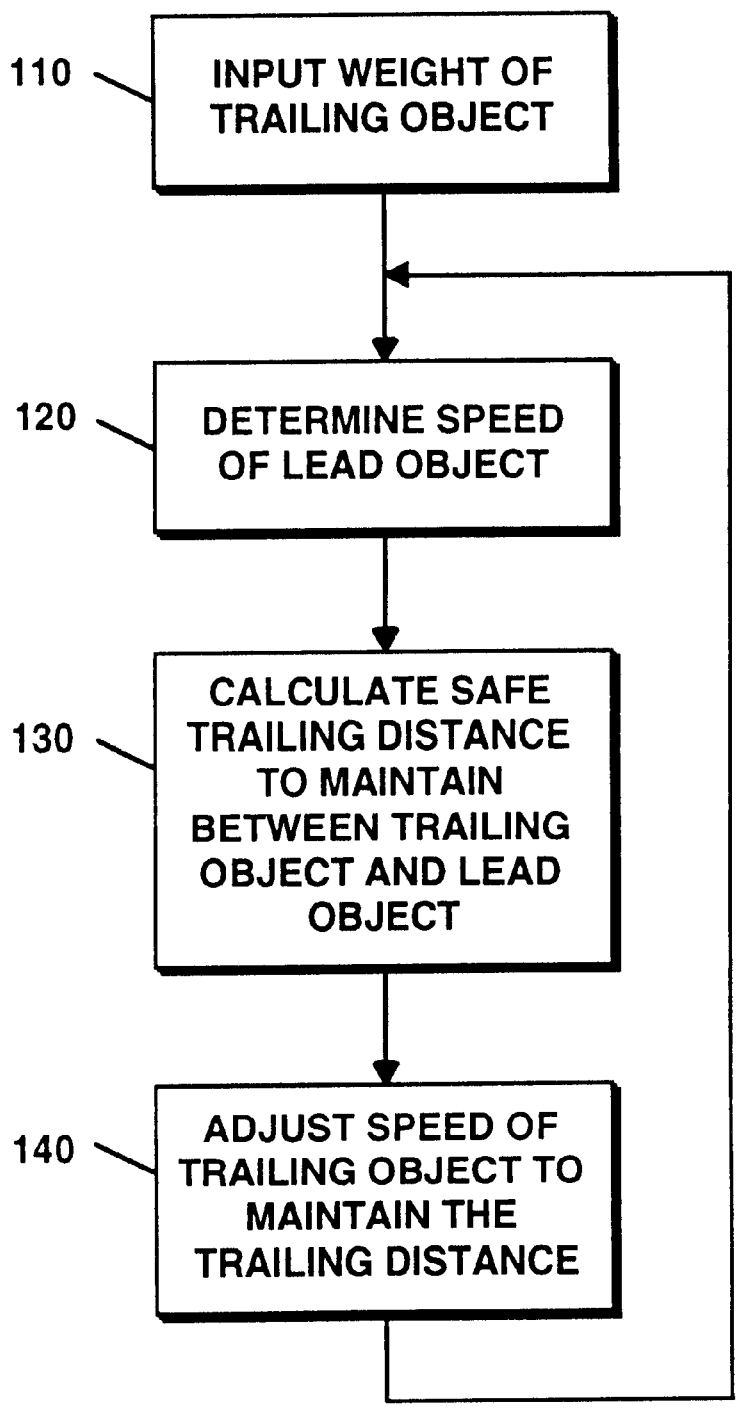
FIG. 2 is a flow chart of the presently disclosed method.

Referring now to FIG. 2 a flow chart of the presently disclosed method is shown. An initial step 110 of the method involves inputting the weight of the vehicle which is equipped with the sensor (the trailing vehicle). The weight of the vehicle is used later to aid in establishing a desired trailing distance between the trailing vehicle and a lead vehicle. This step is only done initially, but can be modified if the system is installed on a different vehicle or if the vehicle is towing something.

The next step 120 is to determine the speed of the lead object. As described above, the sensor utilizes a FMCW signal to determine the presence and relative speed of an object located within the zone of coverage of the sensor. The sensor will detect objects that have the same speed as the trailing vehicle, as well as objects that are completely stopped.

Once the presence and relative speed of a lead vehicle has been determined, the safe trailing distance is calculated, as recited in step 130. The trailing distance can be determined in a number of ways, such as by using the three-second rule or other rule sets which relate a trailing distance to a speed of a vehicle. The trailing distance determination may also take into account the weight of the trailing vehicle or any other characteristics that would have an impact on determining a safe trailing distance.

The next step is to dynamically adjust the accelerator of the trailing vehicle to maintain the desired safe trailing distance between the lead vehicle and the trailing vehicle. This is shown in step 140. The system is dynamic, in that the transmitting and receiving of the signals are continuous, as is the determining of a safe trailing distance and the maintaining of the safe trailing distance.

Figure 3:
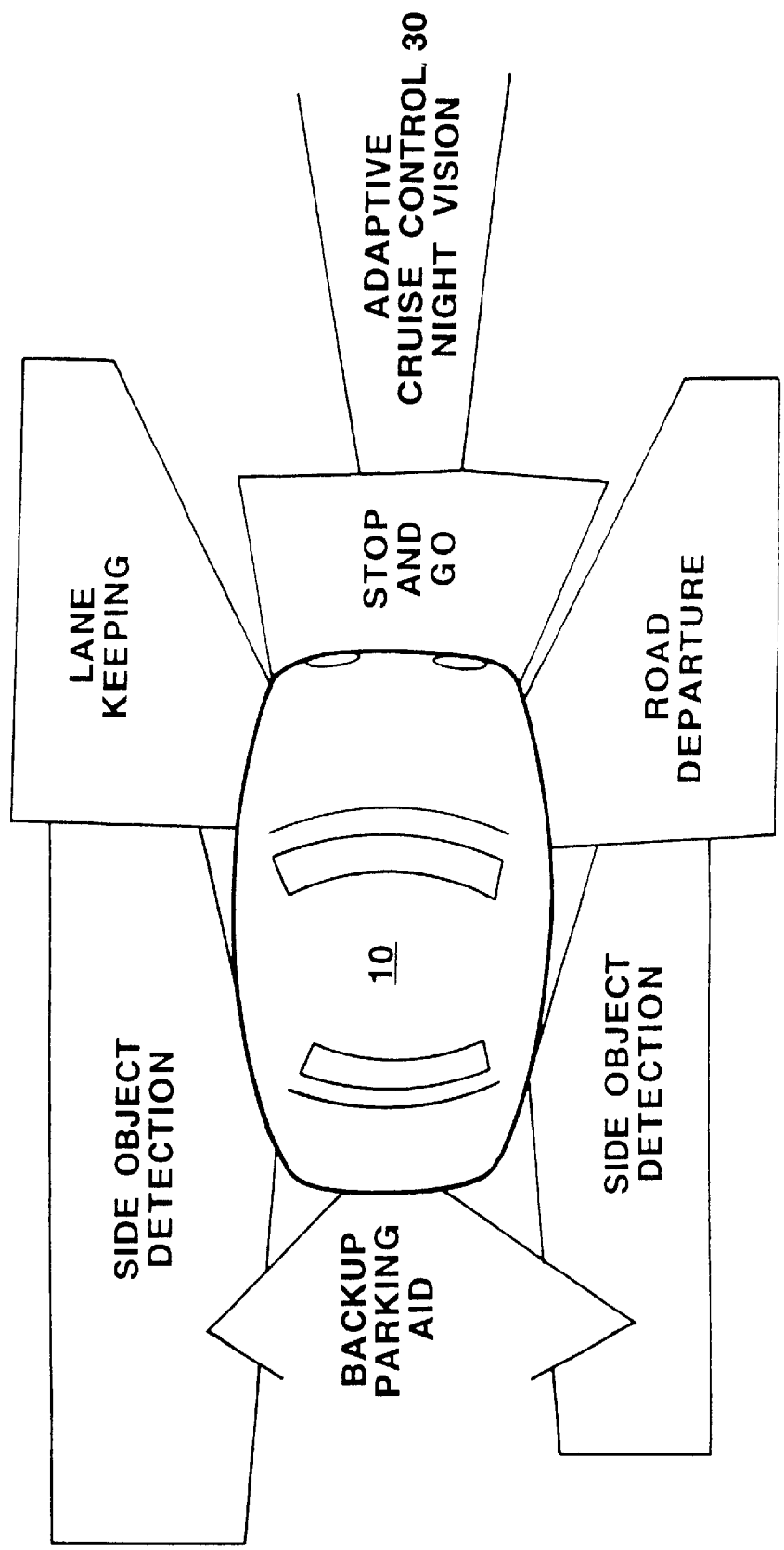
FIG. 3 is a diagram of vehicle equipped with a near object detection (NOD) system including the forward looking remote sensor (FLRS) present invention.
Figure 4:
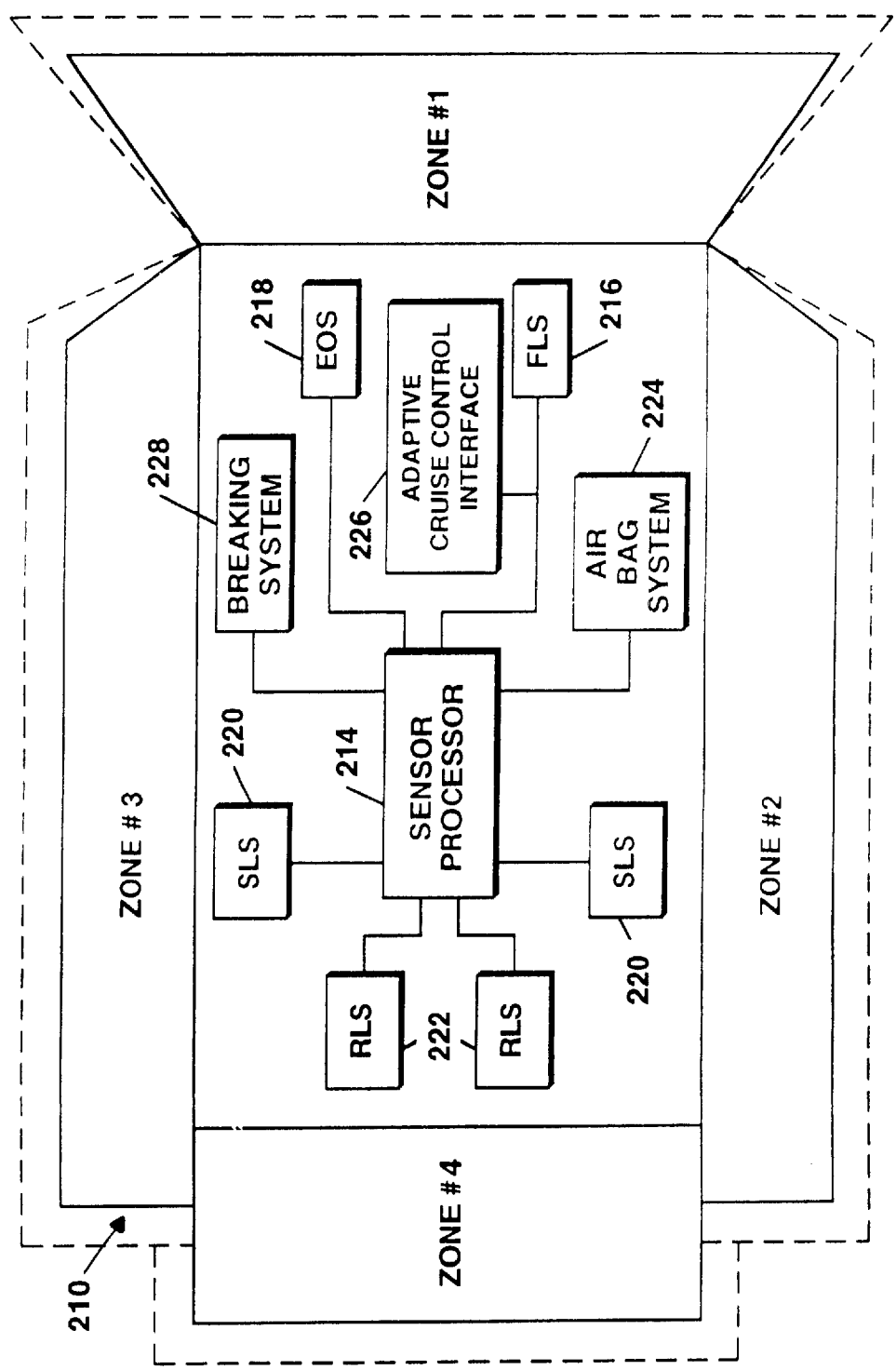
FIG. 4 is a block diagram of the FLRS of FIG. 3 that includes the present invention.

While the forward looking sensor used to provide the adaptive cruise control function can operate independently, the system may also be included as part of a near-object detection system (NODS). Referring now to FIG. 3 and FIG. 4, a near-object detection (NOD) system 210 is disposed on a vehicle 10 which is here shown in phantom since it is not properly a part of the NOD system 210. In this particular embodiment, the near-object detection system 210 includes a forward-looking sensor (FLS) 216 described above, an EOS sensor 218, a plurality of side-looking sensor (SLS)

systems 220 and a plurality of rear-looking sensor (RLS) systems 222. Each of the FLS, EOS, SLS, and RLS systems is coupled to a sensor processor 214.

In this particular embodiment, the sensor processor 214 is shown as a central processor to which each of the FLS, EOS, SLS, and RLS sensors may be coupled via a bus or other means. It should be appreciated that in an alternate embodiment, one or more of the FLS, EOS, SLS, and RLS sensors may include its own processors to perform the processing described below. In this case, the near-object detection system would be provided as a distributed processor system.

Regardless of whether the near-object detection system includes a single or multiple processors, the information collected by each of the sensors is shared and the processor (or processors in the case of a distributed system) implement a decision or rule tree. For example the sensor processor is coupled to the airbag system 224, the adaptive cruise control interface 226, and the braking system 228 of the vehicle. In response to signals from one or more of the FLS, EOS, SLS, and RLS systems, the sensor processor may determine that it is appropriate to "pre-arm" the airbag of the vehicle, adjust the accelerator, or engage the braking system. Other examples are also possible.

For example, the NOD system 10 may be used for a number of functions including bit not limited to blind spot detection, lane change detection, pre-arming of vehicle air bags and to perform a lane stay function, and the above-mentioned pre-arm airbag function.

It should be appreciated that the sensors may be removably deployed on the vehicle. That is, in some embodiments the sensors may be disposed external to the body of the vehicle (i.e. disposed on an exposed surface of the vehicle body), while in other systems the sensors may be embedded into bumpers or other portions of vehicle (e.g. doors, panels, quarter panels, and vehicle front ends, and vehicle rear ends). Its is also possible to provide a system which is both mounted inside the vehicle (e.g., in the bumper or other location) and which is also removable.

Since the characteristics of a single sensor can be changed to allow the sensor to provide detection capabilities in coverage zones of different sizes and shapes, the sensor can also be used on a vehicle that is larger or smaller than the vehicle as shown in FIG. 3. Thus, modification of a coverage zone provided by a particular sensor can be accomplished by programming the sensor and in particular by adjusting the range gates of the sensor.

In one embodiment, using a reconfigurable antenna changes the coverage zone. In one embodiment, the reconfigurable antenna is provided by using microelectromechanical (MEMs) devices that are used to change beam shape and thus beam coverage. The MEMS can change the aperture shape and thus the shape of the beam.

The sensor can be updated. In one particular embodiment, a vehicle owner brings the vehicle to a dealership or other upgrade station and the upgrade station downloads a software upgrade to a programming station. The upgrade may be downloaded from the software upgrade area to the upgrade station via a secure wireless local area network (LAN) or a CDROM mailed to the upgrade station or any other means for transmitting software between two points as is known to those of ordinary skill in the art. Once the upgrade station has the desired software upgrade, a vehicle owner brings the vehicle to the software upgrade station and the upgrade software is transmitted to the vehicle, thereby upgrading software in each of the sensors. In an alternate system, the software upgrade is fed via a satellite system and then transmitted directly from the satellite system to the vehicle. Using either technique, the software operating in the sensors and/or the sensor processor can be modified.

Having described the preferred embodiments of the invention, it will now become apparent to one of ordinary skill in the art that other embodiments incorporating their concepts may be used. It is felt therefore that these embodiments should not be limited to disclosed embodiments but rather should be limited only by the spirit and scope of the appended claims. All publications and references cited herein are expressly incorporated herein by reference in their entirety.

What is claimed is:

1. An adaptive cruise control system comprising:
a sensor for providing detection coverage in a predetermined coverage zone in front of a vehicle, the sensor comprising:
a transmit antenna for transmitting a first RF signal;
a receive antenna for receiving a second RF signal; and
a receiver circuit, coupled to said received antenna; and
an interface coupling said receiver circuit to an accelerator of the vehicle, and wherein said sensor determines the speed of an object in front of the vehicle, calculates a safe trailing distance behind the object in front of said vehicle, said safe trailing distance comprising the distance traveled by said object in a predetermined period of time, and adjusts the accelerator of the vehicle to maintain said safe trailing distance.

2. The adaptive cruise control system of claim 1 wherein said safe trailing distance is adjusted to account for a weight of the vehicle.

3. The adaptive cruise control system of claim 1 wherein said predetermined period of time comprises approximately three seconds.

4. The adaptive cruise control system of claim 1 wherein said the speed of the object is determined by comparing the second RF signal with said first RF signal to determine a frequency difference, wherein said frequency difference is proportional to a distance between said object and said vehicle.

5. The adaptive cruise control system of claim 1 wherein said sensor decreases the speed of the vehicle when a distance between the vehicle and the object is less than said trailing distance.

6. The adaptive cruise control system of claim 1 wherein said second RF signal comprises a reflection of said first RF signal.

7. The adaptive cruise control system of claim 1 wherein said first RF signal comprises a Frequency Modulated Continuous Wave (FMCW) signal.

8. The adaptive cruise control system of claim 1 wherein said vehicle is selected from the group comprising an automobile, a motorcycle, a truck, an aircraft, a marine vehicle, and an agricultural vehicle.

9. The adaptive cruise control system of claim 1 wherein said sensor is upgradeable.

10. The adaptive cruise control system of claim 1 wherein said sensor is capable of providing different coverage zones.

* * * * *

UNITED STATES PATENT AND TRADEMARK OFFICE
CERTIFICATE OF CORRECTION

PATENT NO. : 6,708,100 B2
DATED : March 16, 2004
INVENTOR(S) : Mark E. Russell et al.

It is certified that error appears in the above-identified patent and that said Letters Patent is hereby corrected as shown below:

<u>Column 5,</u>
Line 60, reads "CDROM" and should read -- CD-ROM --.

Signed and Sealed this

Seventeenth Day of August, 2004

JON W. DUDAS
*Acting Director of the United States Patent and Trademark Office*